US012641697B2

(12) United States Patent
Wang et al.

(10) Patent No.: US 12,641,697 B2
(45) **Date of Patent: *May 26, 2026**

(54) LIGHTING CONTROL METHOD AND APPARATUS FOR COLOR PICKING BASED ON ENVIRONMENT, DEVICE, AND STORAGE MEDIUM

(71) Applicant: HANGZHOU TUYA INFORMATION TECHNOLOGY CO., LTD., Hangzhou (CN)

(72) Inventors: Wei Wang, Hangzhou (CN); Yicheng Wang, Hangzhou (CN)

(73) Assignee: HANGZHOU TUYA INFORMATION TECHNOLOGY CO., LTD., Hangzhou (CN)

( * ) Notice: Subject to any disclaimer, the term of this patent is extended or adjusted under 35 U.S.C. 154(b) by 42 days.

This patent is subject to a terminal disclaimer.

(21) Appl. No.: 18/830,729

(22) Filed: Sep. 11, 2024

(65) Prior Publication Data

US 2024/0431004 A1 Dec. 26, 2024

Related U.S. Application Data

(63) Continuation of application No. 18/044,108, filed as application No. PCT/CN2023/073082 on Jan. 19, 2023, now Pat. No. 12,309,893.

(30) Foreign Application Priority Data

Jul. 20, 2022 (CN) ........................ 202210852105.4

(51) Int. Cl.
*H05B 47/10* (2020.01)
*H05B 47/11* (2020.01)

(52) U.S. Cl.
CPC .................................. *H05B 47/11* (2020.01)

(58) Field of Classification Search
CPC ........ H05B 47/00; H05B 47/10; H05B 47/11; H05B 47/125; H05B 47/155; G06T 7/00;
(Continued)

(56) References Cited

U.S. PATENT DOCUMENTS

2017/0265267 A1* 9/2017 Angenendt ............ H05B 45/28
2017/0273156 A1* 9/2017 Niu ........................... F21V 9/08
2018/0160501 A1* 6/2018 Magielse ............. H05B 47/125

FOREIGN PATENT DOCUMENTS

CN 105163435 A 12/2015
CN 107771313 A 3/2018
(Continued)

OTHER PUBLICATIONS

International Search Report on Patentability issued on Apr. 27, 2023, in corresponding International Application No. PCT/CN2023/073082, 7 pages.
(Continued)

*Primary Examiner* — Thai Pham
(74) *Attorney, Agent, or Firm* — Carter, DeLuca & Farrell LLP; George Likourezos

(57) ABSTRACT

The application provides a lighting control method and apparatus for color picking based on an environment, a device, and a storage medium. The method comprises: obtaining an environment image in a current environment in real time; determining an effective color picking range in response to a user operation, and obtaining coordinate point data of the effective color picking range; and obtaining red, green and blue (RGB) data within the effective color picking range, and controlling a color of a corresponding lighting device in the environment based on the RGB data. Through the present application, the effective color picking range can be determined by a user through manual painting, thereby eliminating interference factors in a screen image, and
(Continued)

solving the problem of a poor lighting control effect caused by the interference factors in the screen image.

11 Claims, 5 Drawing Sheets

(58) Field of Classification Search
CPC ..... G06T 7/11; G06T 7/73; G06T 7/90; G06T 2207/10024; G06T 2207/10028
See application file for complete search history.

(56) References Cited

FOREIGN PATENT DOCUMENTS

| | | |
|---|---|---|
| CN | 107960155 A | 4/2018 |
| CN | 108293280 A | 7/2018 |
| CN | 113306486 A | 8/2021 |
| CN | 114585131 A | 6/2022 |
| CN | 115134972 A | 9/2022 |

OTHER PUBLICATIONS

First Office Action issued on Jun. 14, 2023, in corresponding Chinese Application No. 202210852105.4, 12 pages.
Second Office Action issued on Nov. 23, 2023, in corresponding Chinese Application No. 202210852105.4, 9 pages.

* cited by examiner

LIGHTING CONTROL METHOD AND APPARATUS FOR COLOR PICKING BASED ON ENVIRONMENT, DEVICE, AND STORAGE MEDIUM

This application is a continuation of U.S. patent application Ser. No. 18/044,108, filed Jan. 19, 2023, the entire contents of which are incorporated herein by reference.

TECHNICAL FIELD

The present application relates to the technical field of lighting devices, in particular to a lighting control method and apparatus for color picking based on an environment, a device, and a storage medium.

BACKGROUND

With the maturity of smart home device technologies, users may build home theaters by themselves. As a smart home lighting device, which is easier to install and use, the working principle of a background atmosphere light is specifically to control light to emit light of corresponding colors by screen color picking, so it can follow screen images to set off, to create a richer movie-watching atmosphere and provide an immersive movie-watching experience.

At present, commonly used methods are to obtain a real-time screen image in an environment, recognize the screen image to obtain color information, and then control lighting according to the color information. However, in addition to the screen image, the screen image usually includes some interference factors, such as a display screen bezel and a projection screen bezel outside the image, which will affect the lighting control effect. Therefore, there is a problem in the prior art that the interference factors in the screen image lead to the poor lighting control effect.

At present, there is no effective solution to the problem of the poor lighting control effect caused by the interference factors in the screen image in related technologies.

SUMMARY

In this embodiment, a lighting control method and apparatus for color picking based on an environment, a device, and a storage medium are provided, to solve the problem of a poor lighting control effect caused by interference factors in a screen image in related technologies.

According to a first aspect, in this embodiment, a lighting control method for color picking based on an environment is provided, comprising:

obtaining an environment image in a current environment in real time;

determining an effective color picking range in response to a user operation, and obtaining coordinate point data of the effective color picking range;

and obtaining red, green and blue (RGB) data within the effective color picking range, and controlling a color of a corresponding lighting device in the environment based on the RGB data.

In some embodiments, the obtaining an environment image in a current environment in real time comprises:

continuously capturing the environment image in the current environment in real time by an image capture apparatus; and encoding and compressing the environment image, and then generating a video stream and transmitting the video stream to a client.

In some embodiments, the determining an effective color picking range in response to a user operation comprises:

determining the effective color picking range according to a part, outside the effective color picking range, painted by a user in the environment image of the client; or determining the effective color picking range according to a region of the effective color picking range painted by a user in the environment image of the client.

In some embodiments, the determining an effective color picking range in response to a user operation comprises:

determining the effective color picking range according to a boundary line of the effective color picking range painted by the user in the environment image of the client.

In some embodiments, the obtaining coordinate point data of the effective color picking range comprises:

obtaining position information of the effective color picking range in a coordinate system of the environment image; and carrying out processing by an image segmentation technology according to the position information, to obtain the coordinate point data of the effective color picking range.

In some embodiments, the determining an effective color picking range in response to a user operation, and obtaining coordinate point data of the effective color picking range comprises:

determining a plurality of key points of the effective color picking range according to a selection of the user in the environment image of the client;

obtaining coordinate point data of the key points in a coordinate system of the environment image; and determining the coordinate point data of the effective color picking range based on the sorted coordinate point data.

In some embodiments, the method further comprises:

performing a painting operation or a key point selection operation in the environment image of the client based on a corresponding guidance rule.

In some embodiments, the obtaining red, green and blue (RGB) data within the effective color picking range, and controlling a color of a corresponding lighting device in the environment based on the RGB data comprises:

establishing a mapping relationship between each region of the effective color picking range and the lighting device according to a user configuration; and dividing the effective color picking range into a plurality of regions, obtaining RGB values of the regions, and controlling the color of the corresponding lighting device based on the mapping relationship.

According to a second aspect, in this embodiment, a lighting control apparatus for color picking based on an environment is provided, comprising a capture module, a painting module, and a lighting control module, wherein the capture module is configured to obtain an environment image in a current environment in real time;

the painting module is configured to determine an effective color picking range in response to a user operation, and to obtain coordinate point data of the effective color picking range; and the lighting control module is configured to obtain RGB data within the effective color picking range, and to control a color of a corresponding lighting device in the environment based on the RGB data.

According to a third aspect, in this embodiment, a computer device is provided, comprising a memory and a processor, wherein a computer program is stored in the memory and is runnable on the processor, where the processor, when executing the computer program, performs the lighting control method for color picking based on an environment according to the first aspect.

According to a fourth aspect, in this embodiment, a storage medium is provided, where a computer program is stored on the storage medium, and when the program is executed by the processor, the lighting control method for color picking based on an environment according to the first aspect is performed.

Compared to related technologies, the lighting control method and apparatus for color picking based on an environment, the device, and the storage medium provided in this embodiment have the advantages that by obtaining the environment image in the current environment in real time; determining the effective color picking range in response to the user operation, and obtaining the coordinate point data of the effective color picking range; and obtaining the RGB data within the effective color picking range, and controlling the color of the corresponding lighting device in the environment based on the RGB data, the effective color picking range can be determined by the user through manual painting, thereby eliminating the interference factors in the screen image, and solving the problem of the poor lighting control effect caused by the interference factors in the screen image.

The details of one or more embodiments of the present application are presented in the accompanying drawings and description below, to make other features, objectives and advantages of the present application more concise and understandable.

BRIEF DESCRIPTION OF THE DRAWINGS

The accompanying drawings described herein are used to provide a further understanding of the present application, and constitute a part of the present application. The schematic embodiments and description of the present application are used to explain the present application, and do not constitute an improper limitation to the present application. In the accompanying drawings.

In the FIGURES: 102, processor; 104, memory; 106, transmission device; 108, input/output device; 10, capture module; 20, painting module; 30, lighting control module.

DETAILED DESCRIPTION OF EMBODIMENTS

For the sake of a clearer understanding of the objective, technical solution and advantages of the present application, the present application is described and illustrated below in combination with the accompanying drawings and embodiments.

The technical terms or scientific terms involved in the present application shall have general meanings understood by those of ordinary skill in the technical field to which the present application belongs, unless otherwise defined. The similar terms such as "a/an", "one", "a kind of", "the", and "these" in the present application do not represent the limitation of quantity, and may be singular or plural. The terms "comprise/include", "contain", and "has/have" and any variants thereof involved in the present application are intended to cover non-exclusive inclusions. For example, a processes, methods, systems, products or devices that contain a series of steps or modules (units) are not limited to the listed steps or modules (units), and may include unlisted steps or modules (units) or other steps or modules (units) inherent to these processes, methods, products or devices. The similar terms "connection", "connected", and "coupled" involved in the present application are not limited to physical or mechanical connection, and may include electrical connection, whether direct connection or indirect connection. "A plurality of" involved in the present application refers to two or more. "And/or" describes an association relationship of associated objects and represents that there may be three relationships. For example, "A and/or B" may represent that there are three cases: A exists alone, both A and B exists, and B exists alone. In general, the character "/" represents that the associated objects have an "or" relationship. The terms "first", "second", and "third" involved in the present application only distinguish similar objects, and do not represent a specific order of the objects.

Figure 1:
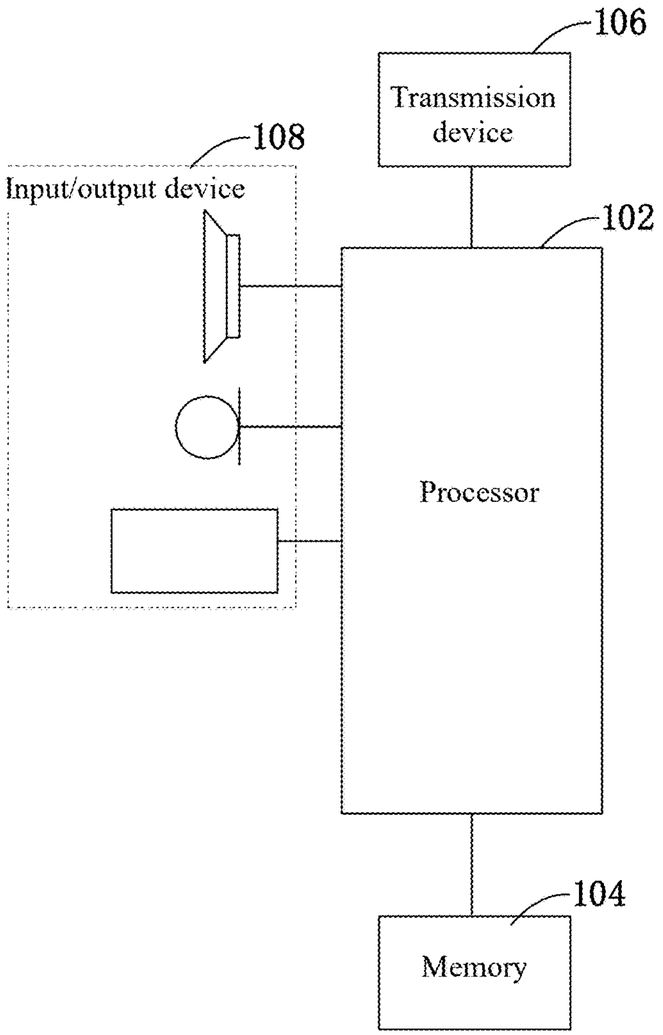
FIG. 1 is a hardware structure diagram of a terminal in a lighting control method for color picking based on an environment in one embodiment.

The method provided in this embodiment may be executed in a terminal, a computer, or a similar arithmetic unit. For example, the method is executed on the terminal. FIG. 1 is a block diagram of a hardware structure of a terminal in a lighting control method for color picking based on an environment in this embodiment. As shown in FIG. 1, the terminal may include one or more (only one is shown in FIG. 1) processors 102 and a memory 104 for storing data, where the processor 102 may include but is not limited to a processing apparatus such as a microprocessing unit (MCU) or a field-programmable gate array (FPGA). The terminal may also include a transmission device 106 for communication and an input/output device 108. Those of ordinary skill in the art may understand that the structure shown in FIG. 1 is only schematic and does not limit the structure of the terminal. For example, the terminal may also include more or fewer components than shown in FIG. 1, or have a configuration different from that shown in FIG. 1.

The memory 104 may be configured to store a computer program, such as a software program and module of application software, such as a computer program corresponding to the lighting control method for color picking based on an environment in this embodiment. The processor 102 executes various functional applications and data processing by running the computer program stored in the memory 104, that is, the method is performed. The memory 104 may include a high-speed random access memory, and may also include non-volatile memories, such as one or more magnetic storage devices, flash memories, or other non-volatile solid-state memories. In some examples, the memory 104 may further include memories remotely arranged with respect to the processor 102. These remote memories may be connected to the terminal through a network. Examples of the network include but are not limited to the Internet, an intranet, a local area network, a mobile communication network, and combinations thereof.

The transmission device 106 is configured to receive or transmit data via one network. The network includes a wireless network provided by a communication supplier of the terminal. In one example, the transmission device 106 includes a network interface controller (NIC), which may be connected to other network devices through a base station to communicate with the Internet. In one example, the transmission device 106 may be a radio frequency (RF) module, which is configured to wirelessly communicate with the Internet.

With the maturity of smart home device technologies, users may build home theaters by themselves. As a smart home lighting device easier to mount and use, the working principle of a background atmosphere light is specifically to control lighting to emit light of corresponding colors by screen color picking, so it can follow screen images to set off, to create a richer movie-watching atmosphere and provide an immersive movie-watching experience.

At present, commonly used methods are to obtain a real-time screen image in an environment, recognize the screen image to obtain color information, and then control lighting according to the color information. However, in addition to the screen image, the screen image usually includes some interference factors, such as a display screen bezel and a projection screen bezel outside the image, which will affect the effect of lighting control. Therefore, there is a problem in the prior art that the interference factors in the screen image lead to a poor lighting control effect.

To solve the above problem, a lighting control method for color picking based on an environment is provided in the embodiment below, which can pick a color based on an environment and actively eliminate interference factors in the environment, to obtain a better and more accurate lighting control effect.

Figure 2:
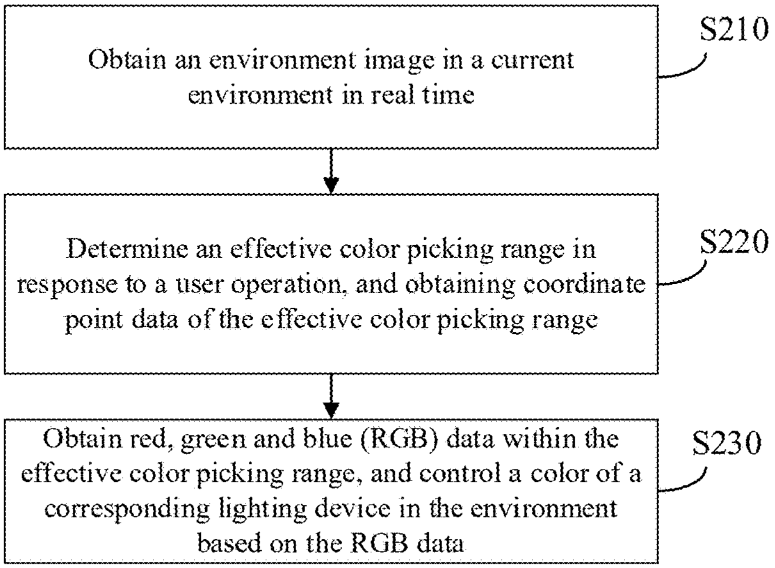
FIG. 2 is a flowchart of a lighting control method for color picking based on an environment in one embodiment.

In this embodiment, a lighting control method for color picking based on an environment is provided. FIG. 2 is a flowchart of the method in this embodiment. As shown in FIG. 2, the method includes the following steps:

Step S210: obtaining an environment image in a current environment in real time.

Specifically, the environment image in the current environment is obtained by an image capture apparatus, and then the obtained environment image is sent to a client. The environment mainly refers to scenes of some movie-watching environments, and the environment image may be specifically obtained from a display screen of a television, a display screen of a computer, a projection screen, etc.

The image capture apparatus may be a single camera or a module of a plurality of cameras, can be flexibly mounted at an upper part, a lower part and other positions of the display screen according to user configuration requirements, and captures the environment image in the current environment through a curved wide-angle lens.

Step S220: determining an effective color picking range in response to a user operation, and obtaining coordinate point data of the effective color picking range.

Specifically, a user receives the real-time environment image sent in the step S210 through the client. The client may be a mobile terminal such as a mobile phone or a tablet computer. The user may preview the current environment image in real time on the client through a preview interface.

In addition to a screen image, the environment image obtained by the image capture apparatus usually includes some interference factors, such as a display screen bezel and a projection screen bezel outside the image. Optionally, the client may also be a terminal with a touch screen. The effective color picking range is determined in response to different operations of the user by making different operations in the environment image obtained in real time on the preview interface, where the operations include region painting, boundary painting, key point selection, etc. The accurate and effective color picking range is obtained by correspondingly obtaining the coordinate point data of the effective color picking range and is synchronized to a lighting control device.

Step S230: obtaining red, green and blue (RGB) data within the effective color picking range, and controlling a color of a corresponding lighting device in the environment based on the RGB data.

Specifically, the user may configure placement positions of the display screen and the corresponding lighting device in the environment according to requirements, to establish a corresponding mapping relationship between each region of the effective color picking range and the lighting device. The lighting device in the environment may include light strips, light posts, etc. The color of the plurality of light strips or light posts is controlled based on the RGB data, to control the color of the lighting device including the light strips and the light posts.

In the above step, the effective color picking range is determined by the user through the painting operation or the key point selection operation at the client, so that the interference factors in the environment image can be effectively eliminated; then the accurate coordinate point data is obtained according to the determined effective color picking range and is transmitted to the lighting control device; and the lighting control device correspondingly controls the color of the corresponding lighting device according to the RGB data of the effective color picking range, so that the problem of the poor lighting control effect caused by the interference factors in the screen image in the prior art is solved.

It should be noted that the lighting control device in the above embodiment includes a main processor and the image capture apparatus, and can perform some image processing operations and lighting control in addition to obtaining the environment image. Multiple functions are implemented in one lighting control device to bring more use convenience for the user. It may also be conceivable that each function is split and implemented by other module or apparatus.

In some embodiments, capturing and obtaining an environment image in a current environment in real time includes the following steps:

- continuously capturing the environment image in the current environment in real time by an image capture apparatus; and encoding and compressing the environment image, and then generating a video stream and transmitting the video stream to a client.

Specifically, after being encoded and compressed, the obtained continuous real-time environment image is converted into the video stream suitable for transmission. When the user opens the preview interface on the client, the client and the lighting control device will communicate with each other and negotiate a media transmission channel. The main processor of the lighting control device sends the video stream obtained by the image capture apparatus to the client through peer-to-peer (P2P) connection, so that the environment image can be previewed in real time on the client.

The environment image obtained in real time is transmitted to the client in the form of the video stream by the image capture apparatus in this embodiment, so that the environment image in the environment can be previewed in real time on the client, such as the display screen of the television and the display screen of the computer. Meanwhile, in combination with the client with the touch screen, the user can effectively and correctly lock the effective color picking range in the current real-time environment image through manual painting and key point selection.

In some embodiments, determining an effective color picking range in response to a user operation specifically includes several user operations below and corresponding guidance rules.

When the user previews the current environment image in real time on the client, the client also provides some guidance rules. Optionally, the user may be guided to operate according to the corresponding guidance rules in animation or other forms, to determine the effective color picking range.

When the region painting operation is performed, the effective color picking range is determined according to a part, outside the effective color picking range, painted by the user in the environment image of the client; or, the effective color picking range is determined according to a region of the effective color picking range that is painted by the user in the environment image of the client.

Figure 3:
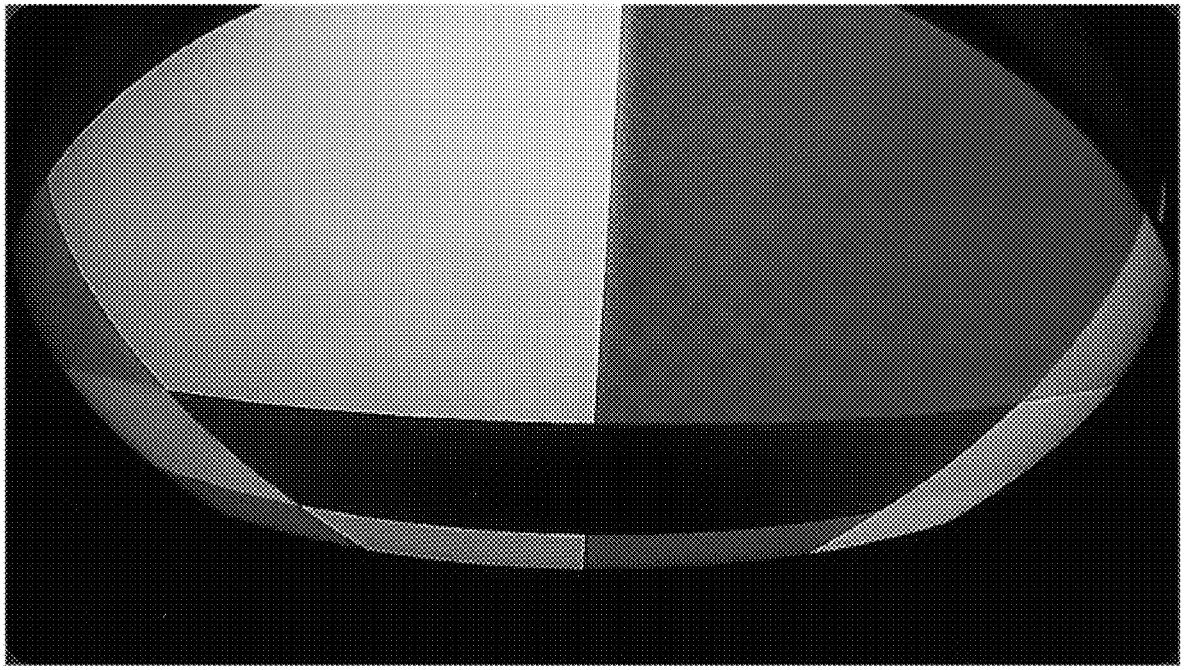
FIG. 3 is a schematic diagram of an environment image obtained in one embodiment.
Figure 4:
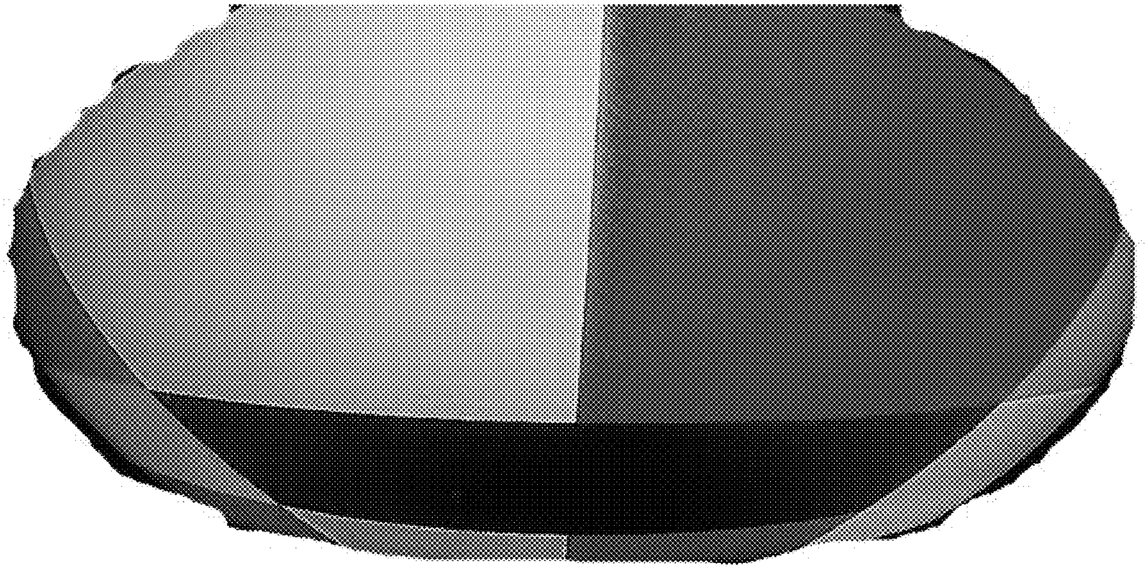
FIG. 4 is a schematic diagram of painting a part outside an effective color picking range in an environment image in one embodiment.
Figure 5:
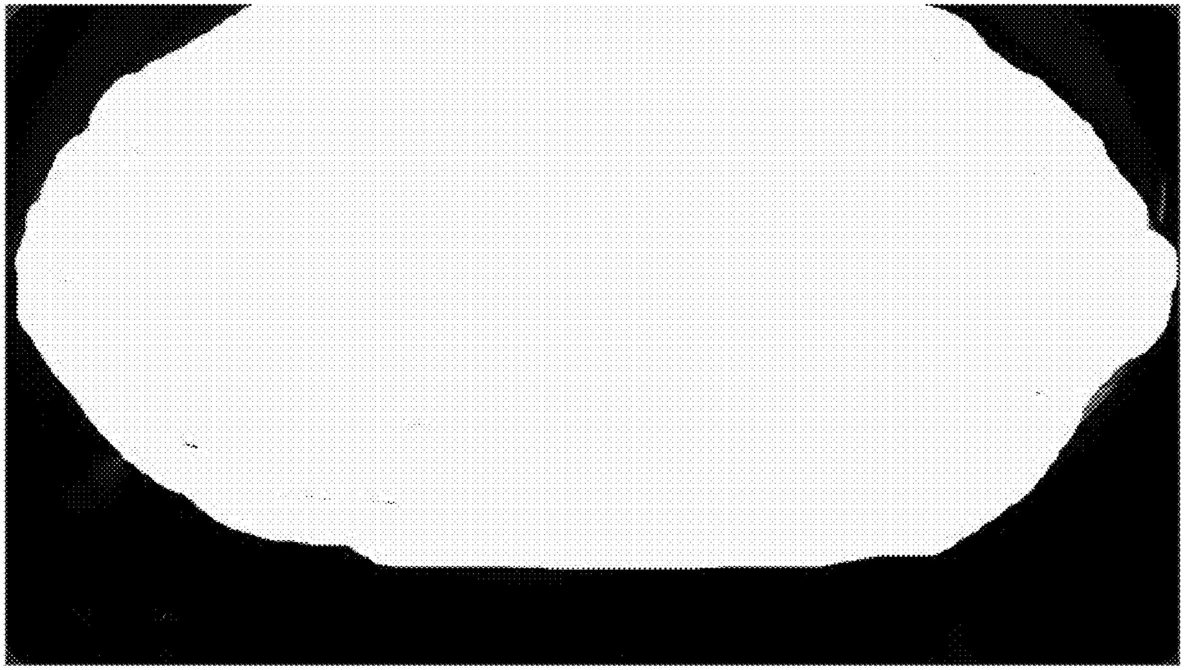
FIG. 5 is a schematic diagram of painting an effective color picking range in an environment image in one embodiment.

Specifically, FIG. 3 is a schematic diagram of the environment image obtained in this embodiment, in which the image capture apparatus is mounted at the upper part of the display screen of the television. On the basis of the environment image in FIG. 3, FIG. 4 is a schematic diagram of painting the part outside the effective color picking range in the environment image, and FIG. 5 is a schematic diagram of painting the effective color picking range in the environment image. Based on the corresponding guidance rules, for example, if the user is guided to paint the effective color picking range, then the part painted by the user is retained to determine the effective color picking range, or if the user is guided to paint the part outside the effective color picking range, the part painted by the user is removed to determine the effective color picking range.

When the boundary painting operation is performed, the effective color picking range is determined according to a boundary line of the effective color picking range that is painted by the user in the environment image of the client.

Figure 6:
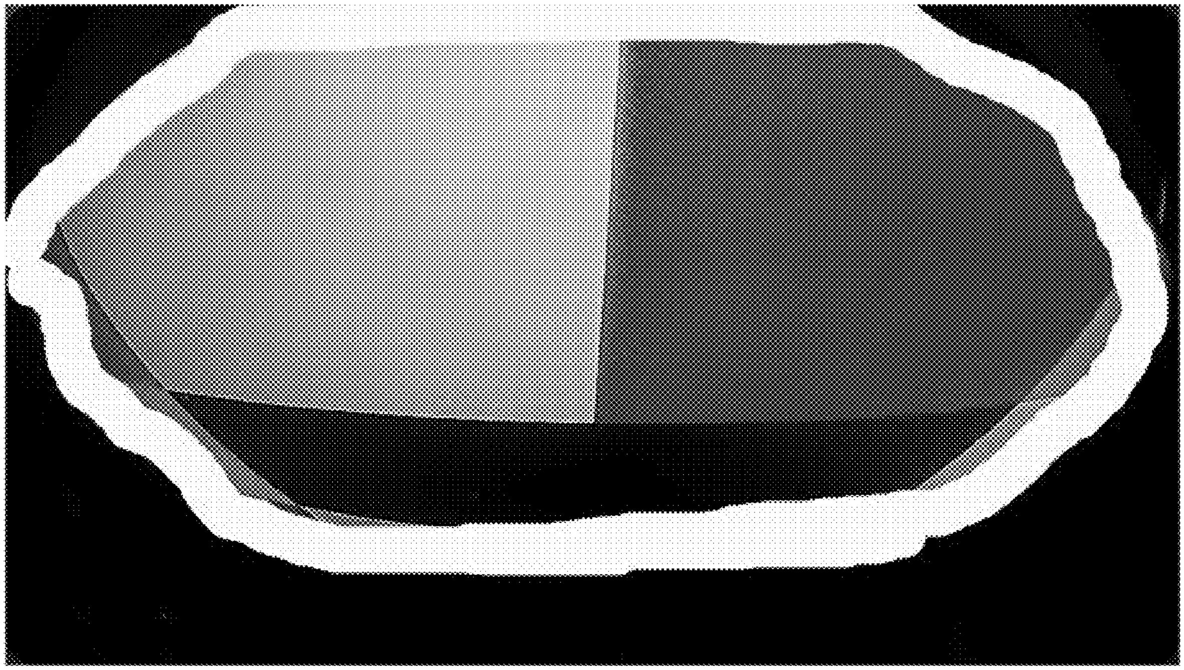
FIG. 6 is a schematic diagram of painting a boundary line of an effective color picking range in an environment image in one embodiment.

Specifically, on the basis of the environment image in FIG. 3, FIG. 6 is a schematic diagram of painting the boundary line of the effective color picking range in the environment image. The boundary painting is performed based on the corresponding guidance rules. For example, if the user is guided to perform painting along a boundary of the effective color picking range in the environment image, then the effective color picking range is determined at the client according to a trajectory painted by the user.

Through the two painting operations of region painting and boundary painting provided in this embodiment, a more flexible interaction can be implemented at the client, and the effective color picking range with higher accuracy and lower accuracy loss can be obtained, where the effective color picking range is approximate to an irregular circle. Further, obtaining coordinate point data of the effective color picking range according to the above determined effective color picking range includes the following steps:

obtaining position information of the effective color picking range in a coordinate system of the environment image; and according to the position information, carrying out processing by an image segmentation technology to obtain coordinate point data of the effective color picking range.

Specifically, the coordinate system is established in the environment image of the client. Usually, with one corner of the environment image as an origin of the coordinate system, the position information of the effective color picking range is obtained in the coordinate system. In the coordinate system, there is theoretically an unlimited number of coordinate point data in the position information of one effective color picking range approximate to the irregular circle. Therefore, such irregular image of the effective color picking range is usually cut according to a specified length by using the image segmentation technology, to obtain a limited number of coordinate point data, where the specified length may be adjusted according to the requirements and the effective color picking range. The smaller the specified length, the more the obtained coordinate point data, and the higher the accuracy of the corresponding effective color picking range. The accuracy is, for example, 1 cm, 2 cm, etc.

In this embodiment, such irregular image of the effective color picking range is segmented by using the image segmentation technology, so that the effective color picking range with higher accuracy is obtained according to the obtained coordinate point data and is transmitted to the lighting control device by the client, and the lighting control device accurately divides and locks the effective color picking range of the obtained environment image in the lighting control device according to the limited number of coordinate point data.

Figure 7:
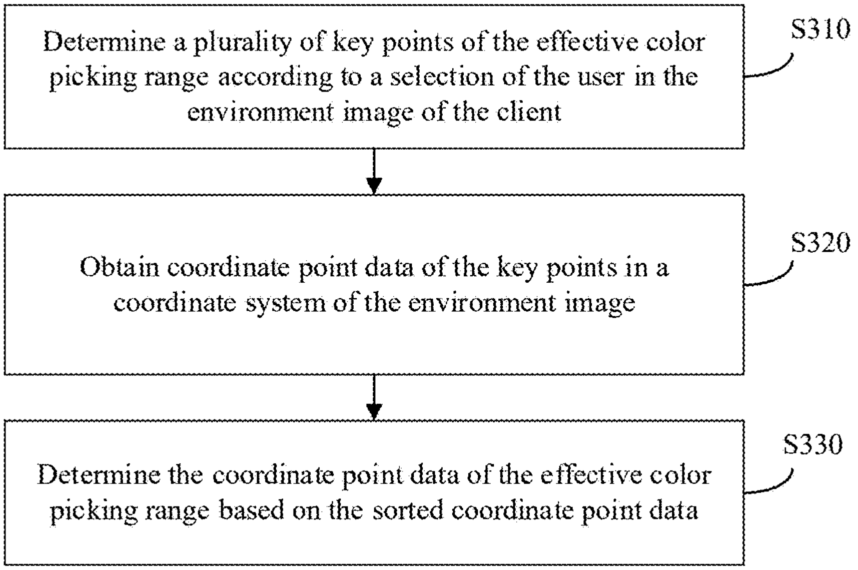
FIG. 7 is a flowchart illustrating steps of determining an effective color picking range in response to a user operation and obtaining coordinate point data of the effective color picking range according to one embodiment.

FIG. 7 is a flowchart illustrating steps of determining an effective color picking range in response to a user operation and obtaining coordinate point data of the effective color picking range according to one embodiment. As shown in FIG. 7, when the key point selection operation is performed, determining an effective color picking range in response to a user operation, and obtaining coordinate point data of the effective color picking range include the following steps:

Step S310: determining a plurality of key points of the effective color picking range according to a selection of the user in the environment image of the client.

Figure 8:
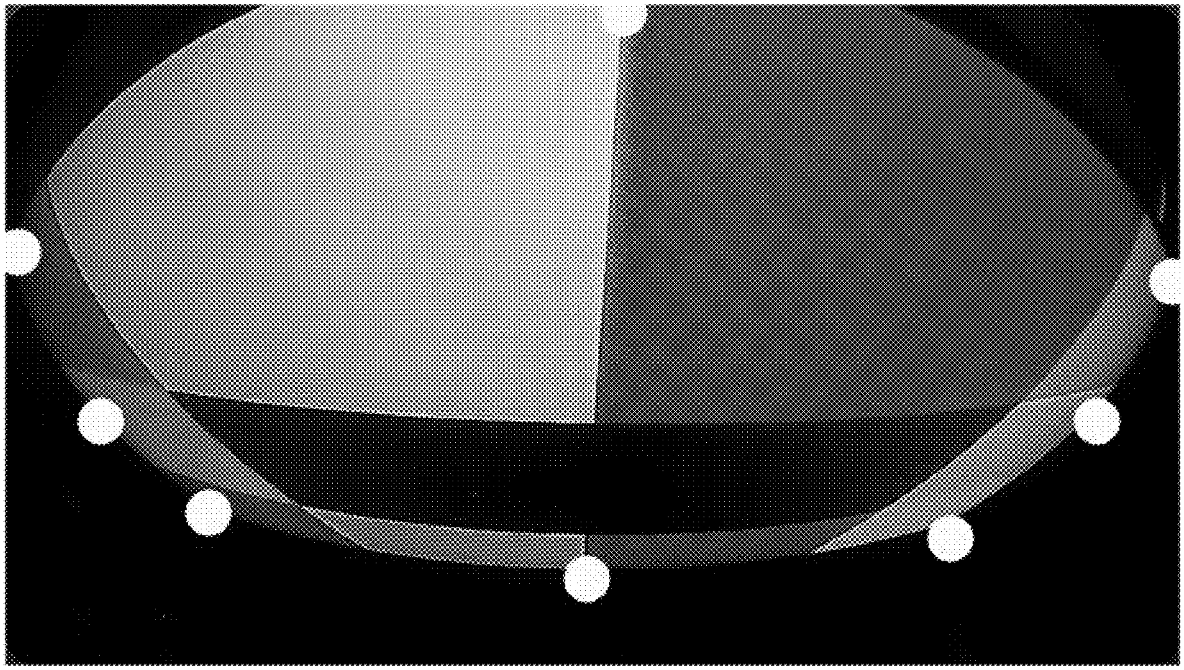
FIG. 8 is a schematic diagram of determining key points of an effective color picking range by selection in an environment image in one embodiment.

Specifically, on the basis of the environment image in FIG. 3, FIG. 8 is a schematic diagram of determining the key points of the effective color picking range by selection in the environment image. When the key point selection is performed, the guidance rules include the guidance of the user to select the key points in a key region, where the key points include at least eight key points, which are specifically upper, lower, left and right vertices and other four key points on the boundary of the effective color picking range.

To obtain a more accurate effective color picking range, the guidance rules may also be added with some additional supplementary rules. For example, when the number of the key points selected by the user is less than eight, or when the user does not perform selection in the key region specified by the client, the determination of the current effective color picking range cannot be saved.

Step S320: obtaining coordinate point data of the key points in a coordinate system of the environment image.

Specifically, the coordinate system is established in the environment image of the client. Usually, the coordinate system is established with one corner of the environment image as the origin, such as with an upper left corner of the image as the origin. The coordinate point data of the key points is obtained according to a position of the center of each key point relative to the origin of the coordinate system.

Step S330: determining the coordinate point data of the effective color picking range based on the sorted coordinate point data.

Specifically, after being calculated, the coordinate point data of each key point is arranged in a specific order such as according to a clockwise direction or an anticlockwise direction, the sorted coordinate point data is transmitted to the lighting control device, and the lighting control device determines the effective color picking range of the obtained environment image in the lighting control device by using the same calculation method according to the coordinate point data of the effective color picking range calculated by the client.

The effective color picking range is determined by the key point selection operation in this embodiment, so that a more flexible method for interaction with the user is implemented. The selection can be performed in the key region at the client based on the corresponding guidance rule, the effective color picking range is determined according to the region composed of the selected key points, then the coordinate system is established in the environment image to obtain the coordinate point data of the key points, and the coordinate point data of the effective color picking range is further determined, to determine the effective color picking range in the lighting control device based on the same calculation method.

In the above embodiment, three different methods for determining the effective color picking range and the corresponding guidance rules are provided, and according to different user operations, the effective color picking range can be determined and the coordinate point data of the effective color picking range can be calculated, to implement more flexible interaction with the user, more accurately determine the effective color picking range, and reduce accuracy loss and errors.

In some embodiments, the method further includes:

performing a painting operation or a key point selection operation in the environment image of the client based on a corresponding guidance rule.

Specifically, the corresponding guidance rule may be implemented by means of animation guidance, etc. on the client. The painting operation includes region painting and boundary painting.

In some embodiments, obtaining RGB data within the effective color picking range, and controlling a color of a corresponding lighting device in the environment based on the RGB data includes the following steps:

establishing a mapping relationship between each region of the effective color picking range and the lighting device according to a user configuration; and dividing the effective color picking range into a plurality of regions, obtaining RGB values of the regions, and controlling the color of the corresponding lighting device based on the mapping relationship.

Specifically, before the lighting control is implemented, the user will be guided to perform configuration at the client, including but not limited to an arrangement position of the image capture apparatus, an input position of the light strips, a winding direction of the light strips, a placement position of the light posts, and a display screen region.

The effective color picking range is divided into a plurality of regions such as 2*2 or 3*3 regions, and the RGB data containing the most color data is extracted from each block. After obtaining the user configuration, the lighting control device will establish a mapping relationship between RGB light beads and corresponding television regions. The lighting control device will generate a color of the corresponding light bead according to the captured real-time image, and turn on the corresponding user-configured light strip and light post in the region of the corresponding effective color picking range with this color to implement real-time synchronization of the effect of the lighting device and the display screen image. The specific implementation effect is illustrated by taking an example where the 2*2 regions are distributed. The light posts are usually placed on left and right sides of the display screen. When the lighting control is performed, for example, upper and lower blocks on the left side of the display screen after region division display different colors, respectively. Accordingly, the light post on the left side can also be subjected to region division, and upper and lower regions correspondingly display corresponding colors of the regions of the display screen.

In this embodiment, the color of the lighting device such as the light strip or the light post configured by the user in the environment is correspondingly controlled according to the RGB data of the effective color picking range, so that the correspondence between the color of the lighting device and the environment image is implemented; and the effective color picking range is divided in the environment image, so that the interference factors in the environment image are eliminated, the more accurate and effective lighting control is implemented, and the better lighting control effect is provided.

This embodiment is described and illustrated by the preferred embodiment below.

Figure 9:
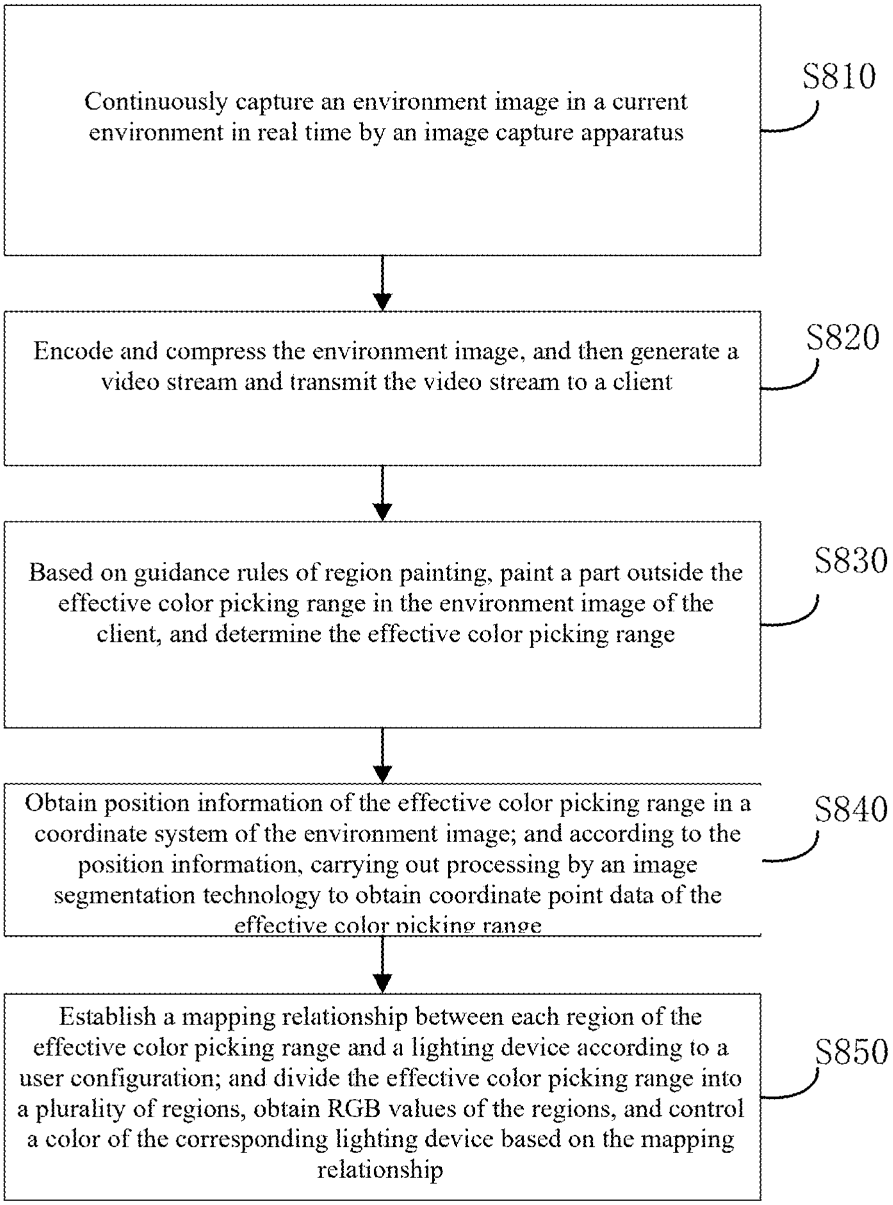
FIG. 9 is a flowchart of a lighting control method for color picking based on an environment in one preferred embodiment.

FIG. 9 is a flowchart of a lighting control method for color picking based on an environment in this preferred embodiment. As shown in FIG. 9, the method includes the following steps:

Step S810: continuously capturing an environment image in a current environment in real time by an image capture apparatus.

Step S820: encoding and compressing the environment image, and then generating a video stream and transmitting the video stream to a client.

Step S830: based on guidance rules of region painting, painting a part outside the effective color picking range in the environment image of the client, and determining the effective color picking range.

Step S840: obtaining position information of the effective color picking range in a coordinate system of the environment image; and according to the position information, carrying out processing by an image segmentation technology to obtain coordinate point data of the effective color picking range.

Step S850: establishing a mapping relationship between each region of the effective color picking range and a lighting device according to a user configuration; and dividing the effective color picking range into a plurality of regions, obtaining RGB values of the regions, and controlling a color of the corresponding lighting device based on the mapping relationship.

In this preferred embodiment, according to the painting operation of the user on the client, a more accurate effective color picking range can be obtained, and the influence of the interference factors in the environment image is eliminated, so that the color of the lighting device is correspondingly controlled according to the RGB data in the effective color picking range, to achieve the more accurate and better lighting control effect.

It should be noted that the steps shown in the above flow or in the flowchart of the accompanying drawing may be performed in a computer system such as a set of computer-executable instructions, and although the logical order is shown in the flowchart, in some cases, the steps shown or described may be performed in a different order from here.

In this embodiment, a lighting control apparatus for color picking based on an environment is further provided. The apparatus is configured to implement the above embodiment and the preferred embodiment. The described ones will not be repeated. The terms "module", "unit", and "subunit" used below may be a combination of software and/or hardware that implements predetermined functions. Although the apparatus described in the embodiment below is preferably implemented by software, the implementation by hardware or a combination of software and hardware may also be possible and conceivable.

Figure 10:
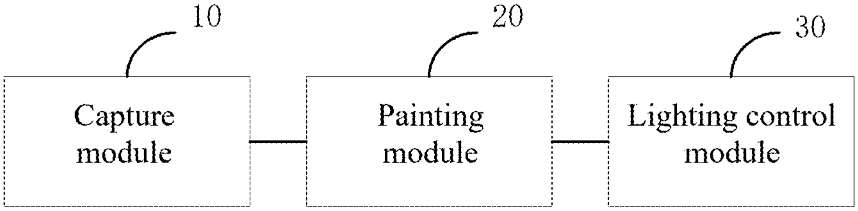
FIG. 10 is a structure block diagram of a lighting control apparatus for color picking based on an environment in one embodiment.

FIG. 10 is a structure block diagram of a lighting control apparatus for color picking based on an environment in this embodiment. As shown in FIG. 10, the apparatus includes a capture module 10, a painting module 20, and a lighting control module 30.

The capture module 10 is configured to capture and obtain an environment image in a current environment in real time.

the painting module 20 is configured to determine an effective color picking range in response to a user operation, and to obtain coordinate point data of the effective color picking range.

The lighting control module 30 is configured to obtain RGB data within the effective color picking range, and to control a color of a corresponding lighting device in the environment based on the RGB data.

Through the apparatus provided in this embodiment, the effective color picking range is determined by the user through the painting operation or the key point selection operation at the client, so that the interference factors in the environment image can be effectively eliminated; then the accurate coordinate point data is obtained according to the determined effective color picking range and is transmitted to the lighting control device; and the lighting control device correspondingly controls the color of the corresponding lighting device according to the RGB data of the effective color picking range, so that the problem of the poor lighting control effect caused by the interference factors in the screen image in the prior art is solved.

It should be noted that the above modules may be functional modules or program modules, which may be implemented by software or hardware. For the modules implemented by the hardware, the above modules may be located in the same processor; or the above modules may also be located in different processors in any combination, respectively.

In this embodiment, a computer device is further provided, including a memory and a processor, where a computer program is stored in the memory, and the processor is set to run the computer program to perform the steps in any one of the above method embodiments.

Optionally, the above computer device may also include a transmission device and an input/output device, where the transmission device is connected to the above processor, and the input/output device is connected to the above processor.

It should be noted that specific examples in this embodiment may refer to the examples described in the above embodiment and optional implementation, and will not be repeated in this embodiment.

In addition, in combination with the lighting control method for color picking based on an environment provided in the above embodiment, a storage medium may also be provided in this embodiment. A computer program is stored on the storage medium; and when the computer program is executed by the processor, the lighting control method for color picking based on an environment in any one of the above embodiments is performed.

It should be understood that the specific embodiment described herein is only used to explain this application, and is not used to limit it. According to the embodiment provided in this application, all other embodiments obtained by those of ordinary skill in the art without creative efforts fall within the scope of protection of the present application.

Obviously, the accompanying drawings are only some examples or embodiments of the present application. Those of ordinary skill in the art may also apply the present application to other similar cases according to these accompanying drawings without creative efforts. In addition, it is understandable that although the work done in this development process may be complex and lengthy, some changes in design, manufacturing or production made by those of ordinary skill in the art according to the technical content disclosed in the present application are only conventional technical means, and should not be considered as insufficient content disclosed in the present application.

The term "embodiment" in the present application refers to that the specific features, structures or characteristics described in combination with the embodiment may be included in at least one embodiment of the present application. The phrase appearing in each position of the specification does not necessarily mean the same embodiment, nor does it mean that it is mutually exclusive with other embodiments to be independent or alternative. Those of ordinary skill in the art can clearly or implicitly understand that the embodiment described in the present application may be combined with other embodiments without conflicts.

The above embodiments only express several implementations of the present application, and cannot be understood as limiting the scope of protection of the patent although their descriptions are more specific and detailed. It should be pointed out that those of ordinary skill in the art may also make various changes and improvements without departing from the concept of the present application, all of which fall within the scope of protection of the present application. Therefore, the scope of protection of the present application shall be subject to the appended claims.

What is claimed is:

1. A lighting control method for color picking based on an environment color extraction, comprising:

obtaining an environment image, by a capture module, in a current environment in real time;

determining an effective color picking range, by a painting module, in response to a user operation, and obtaining coordinate point data of the effective color picking range by the painting module; and obtaining red, green and blue (RGB) data within the effective color picking range by a lighting control module, and controlling a color of a corresponding lighting device in the environment, by the lighting control module, based on the RGB data, wherein determining the effective color picking range, by the painting module, in response to the user operation, and obtaining the coordinate point data of the effective color picking range by the painting module comprises:

determining a plurality of key points of the effective color picking range according to a selection of a user in the environment image of a client;

obtaining coordinate point data of the key points in a coordinate system of the environment image; and determining the coordinate point data of the effective color picking range based on the sorted coordinate point data.

2. The method according to claim 1, wherein obtaining the environment image, by the capture module, in the current environment in real time comprises:

continuously capturing the environment image in the current environment in real time by an image capture apparatus; and encoding and compressing the environment image, and then generating a video stream and transmitting the video stream to the client.

3. The method according to claim 1, wherein determining the effective color picking range, by the painting module, in response to the user operation comprises:

determining the effective color picking range according to a part, outside the effective color picking range, painted by a user in the environment image of the client; or determining the effective color picking range according to a region of the effective color picking range painted by a user in the environment image of the client.

4. The method according to claim 1, wherein determining the effective color picking range, by the painting module, in response to the user operation comprises:

determining the effective color picking range according to a boundary line of the effective color picking range painted by a user in the environment image of the client.

5. The method according to claim 3, wherein obtaining the coordinate point data of the effective color picking range by the painting module comprises:

obtaining position information of the effective color picking range in the coordinate system of the environment image; and carrying out processing by an image segmentation technology according to the position information, to obtain the coordinate point data of the effective color picking range.

6. The method according to claim 4, wherein obtaining the coordinate point data of the effective color picking range by the painting module comprises:

obtaining position information of the effective color picking range in the coordinate system of the environment image; and carrying out processing by an image segmentation technology according to the position information, to obtain the coordinate point data of the effective color picking range.

7. The method according to claim 1, further comprising:

performing a painting operation or a key point selection operation in the environment image of the client based on a corresponding guidance rule.

8. The method according to claim 3, further comprising:

performing a painting operation or a key point selection operation in the environment image of the client based on a corresponding guidance rule.

9. The method according to claim 4, further comprising:

performing a painting operation or a key point selection operation in the environment image of the client based on a corresponding guidance rule.

10. The method according to claim 1, wherein obtaining the RGB data within the effective color picking range by the lighting control module, and controlling a color of a corresponding lighting device in the environment, by the lighting control module, based on the RGB data comprises:

establishing a mapping relationship between each region of the effective color picking range and the lighting device according to a user configuration; and dividing the effective color picking range into a plurality of regions, obtaining RGB values of the regions, and controlling the color of the corresponding lighting device based on the mapping relationship.

11. A lighting control apparatus for color picking based on an environment color extraction, comprising a capture module, a painting module, and a lighting control module, wherein the capture module is configured to obtain an environment image in a current environment in real time;

the painting module is configured to determine an effective color picking range in response to a user operation, and to obtain coordinate point data of the effective color picking range; and the lighting control module is configured to obtain red, green and blue (RGB) data within the effective color picking range, and to control a color of a corresponding lighting device in the environment based on the RGB data;

wherein the painting module is configured to determine the effective color picking range in response to the user operation, and to obtain the coordinate point data of the effective color picking range in the following manner: determining a plurality of key points of the effective color picking range according to a selection of a user in the environment image of a client;

obtaining coordinate point data of the key points in a coordinate system of the environment image; and determining the coordinate point data of the effective color picking range based on the sorted coordinate point data.

* * * * *